(12) United States Patent
Breu et al.

(10) Patent No.: US 11,358,479 B2
(45) Date of Patent: Jun. 14, 2022

(54) AGRICULTURAL VEHICLE HAVING ELECTRICAL DRIVELINE

(71) Applicant: AGCO International GmbH, Neuhausen (CH)

(72) Inventors: Wolfgang Breu, Aitrang (DE); Margit Hiemer, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 110 days.

(21) Appl. No.: 16/644,478

(22) PCT Filed: Sep. 4, 2018

(86) PCT No.: PCT/IB2018/000985
§ 371 (c)(1),
(2) Date: Mar. 4, 2020

(87) PCT Pub. No.: WO2019/048921
PCT Pub. Date: Mar. 14, 2019

(65) Prior Publication Data
US 2020/0282846 A1    Sep. 10, 2020

(30) Foreign Application Priority Data
Sep. 5, 2017  (GB) ........................................ 1714194

(51) Int. Cl.
*B60L 50/60* (2019.01)
*B60L 53/00* (2019.01)
(Continued)

(52) U.S. Cl.
CPC .............. *B60L 50/66* (2019.02); *A01B 76/00* (2013.01); *B60L 53/00* (2019.02); *B60L 53/80* (2019.02);
(Continued)

(58) Field of Classification Search
CPC ...... B60L 50/66; B60L 53/00; B60L 2200/40; A01B 76/00; B62D 21/18; B62D 49/06
See application file for complete search history.

(56) References Cited

U.S. PATENT DOCUMENTS 5,474,148 A * 12/1995 Takata .................... B60L 50/52
                                                            180/206.2
6,082,084 A *  7/2000 Reimers ............... A01D 75/306
                                                                56/11.9
(Continued)

FOREIGN PATENT DOCUMENTS

DE    20 2014 000738 U1    3/2014
EP         1992513 A1    11/2008
(Continued)

OTHER PUBLICATIONS

UK Intellectual Property Office, Search Report for priority Application No. GB 1714194.6, dated Jul. 30, 2018.
(Continued)

*Primary Examiner* — Erez Gurari

(57) ABSTRACT

An agricultural vehicle including a chassis and a rechargeable high voltage DC electric battery, the chassis incorporating an intermediate frame and an encapsulated power electronics unit located within the intermediate frame. Since the power electronics unit is separated from the electric battery, this allows for ready repair and/or replacement of the battery over the lifetime of the vehicle.

18 Claims, 7 Drawing Sheets

(51) Int. Cl.
  *B60L 53/80* (2019.01)
  *A01B 76/00* (2006.01)
  *B62D 21/18* (2006.01)
  *B62D 49/06* (2006.01)
(52) U.S. Cl.
  CPC ............. *B62D 21/18* (2013.01); *B62D 49/06* (2013.01); *B60L 2200/40* (2013.01)

(56) References Cited

U.S. PATENT DOCUMENTS

| | | | | |
|---|---|---|---|---|
| 6,155,369 | A * | 12/2000 | Whittaker | B62M 6/90 180/220 |
| 6,253,865 | B1 * | 7/2001 | Suzuki | B60K 6/383 180/65.25 |
| 6,334,364 | B1 * | 1/2002 | Suzuki | B60L 50/66 73/862.08 |
| 2003/0205421 | A1 * | 11/2003 | Allen | B60L 58/18 180/65.1 |
| 2004/0149500 | A1 * | 8/2004 | Chernoff | B62D 21/07 180/65.1 |
| 2004/0163875 | A1 * | 8/2004 | Chernoff | B60G 17/0195 180/312 |
| 2012/0055725 | A1 * | 3/2012 | Mizoguchi | H01M 10/6563 180/68.5 |
| 2012/0103710 | A1 * | 5/2012 | Atsuchi | B60L 50/66 180/65.31 |
| 2013/0168168 | A1 * | 7/2013 | Takagi | B60K 6/22 180/65.245 |
| 2013/0181675 | A1 * | 7/2013 | Kawasaki | B60L 58/20 320/109 |
| 2013/0220718 | A1 | 8/2013 | Yusuke et al. | |
| 2014/0124278 | A1 * | 5/2014 | Takamura | H05K 7/20918 180/65.51 |
| 2014/0264207 | A1 * | 9/2014 | Sekine | B62B 5/0033 254/20 |
| 2014/0338999 | A1 * | 11/2014 | Fujii | H01M 10/6563 180/68.5 |
| 2015/0266382 | A1 | 9/2015 | Penmetsa et al. | |
| 2016/0339328 | A1 * | 11/2016 | Simeray | A63C 17/26 |
| 2016/0368395 | A1 | 12/2016 | Murase | |
| 2017/0218832 | A1 * | 8/2017 | Kurokawa | F01P 11/0295 |
| 2017/0271727 | A1 * | 9/2017 | Ito | H01M 50/20 |
| 2018/0244142 | A1 * | 8/2018 | Takayanagi | B60K 15/063 |
| 2020/0231050 | A1 * | 7/2020 | Hirukawa | B60L 3/0046 |
| 2020/0282846 | A1 * | 9/2020 | Breu | B60L 50/66 |
| 2021/0221210 | A1 * | 7/2021 | Ryuno | B60K 1/00 |
| 2021/0313121 | A1 * | 10/2021 | Macaluso | B60K 1/04 |

FOREIGN PATENT DOCUMENTS

| | | |
|---|---|---|
| JP | 2004 168149 A | 6/2004 |
| KR | 2013 0040287 A | 4/2013 |
| WO | 2007/045365 A1 | 4/2007 |
| WO | 2011/161471 A2 | 12/2011 |

OTHER PUBLICATIONS

European Patent Office, International Search Report for related International Application No. PCT/IB2018/000985, dated Dec. 13, 2018.

* cited by examiner

AGRICULTURAL VEHICLE HAVING ELECTRICAL DRIVELINE

FIELD OF THE INVENTION

The present invention relates to an agricultural vehicle and in particular to electrically driven agricultural vehicles such as all-electric drive tractors.

BACKGROUND

Electric batteries used as a propulsion power source in an all-electric agricultural vehicle comprise a high voltage DC battery pack that consists of individual modules and cells organized in series and parallel to deliver a voltage of up to around 700V. In addition to the propulsion system power supply, such agricultural vehicles also require an internal DC voltage network (12V or 24V) for supplying vehicle components and external systems such as trailer lights and the like and power to operate implements that may be connected to the agricultural vehicle. A DC/DC converter may be provided to convert the high voltage DC to a low voltage DC e.g. 12V power source. Power electronics are used to convert the high voltage DC power supply as necessary, for example to provide high power AC at a fixed frequency. However, the connection of implements (and indeed other operating components of the vehicle) to a high voltage power source requires that to meet legislative requirements a specialist electrical engineer is required should there be a need to repair or replace the elements permanently connected to the high voltage source. This prevents ready repair and replacement of connected parts and fittings in a working agricultural environment.

It is an advantage of the present invention that it addresses this problem. Further advantages will also become apparent from the below.

SUMMARY OF THE INVENTION

According to a first aspect of the present invention an agricultural vehicle comprises a chassis and a rechargeable high voltage DC electric battery, in which the chassis incorporates an intermediate frame section and an encapsulated power electronics unit located within the intermediate frame section.

It is an advantage of this construction that the power electronics unit is separated from the electric battery, allowing for repair and/or replacement of the battery over the lifetime of the vehicle. In particular, if, as anticipated, the design, in particular the size of rechargeable electric batteries changes over time, such new rechargeable electric batteries can easily be incorporated into this design of agricultural vehicle.

Preferably, the power electronics unit is integrated in the intermediate frame section of the chassis.

More preferably, the power electronics unit is integrated in the intermediate frame section of the chassis, below the battery.

Preferably, the vehicle further comprises a power distribution unit and components of a transformer oil supply system connected to the electric battery. More preferably the power distribution unit and the components of the transformer oil supply system are mounted to the intermediate frame section. This has as an advantage that connections between the battery and the power distribution unit can be relatively short.

Preferably, an electrically powered driveline is connected to the intermediate frame section. This has as an advantage that the connections between the battery and the electrically powered driveline can be relatively short.

Preferably the chassis is provided with two transversely spaced fixed mounting supports and a third mounting point for pivotally mounting a front support, the front support extending transversely across the chassis.

Preferably the intermediate frame section of the chassis comprises left and right frame parts, each connected at its ends by a front frame part and a rear frame part, each of the left and right frame parts being provided with one of the rear mounting supports adjacent the rear frame part, and a bottom frame part located near and extending between a lower region of each of the left and right, front and rear frame parts. Preferably, the front frame part is provided with the third mounting point for pivotally mounting the front support.

Preferably, the battery is mounted to the chassis by way of the left and right rear mounting supports and the third mounting point.

Preferably the bottom frame part is provided with a plurality of openings. More preferably, at least one of the plurality of openings is transversely spaced from another or the others of the plurality of openings.

Preferably the vehicle further comprises one or more implement connectors connected to the high voltage DC electric battery.

Alternatively, the vehicle further comprises one or more implement connectors connected to the high voltage DC electric battery and the or each of the one or more implement connectors connects to the power electronics unit through the plurality of openings in the intermediate frame section of the chassis.

Preferably the power electronics unit is provided with one or more implement connector means releasably to connect the at least one implement connector to the power electronics unit. More preferably, the power electronics unit is provided with power unit connector means releasably to connect the at least one implement connector means to the power electronic unit. This has as an advantage that the power electronics unit may be disconnected from the implement connectors to electrically isolate the battery and the power electronics unit allowing repair and maintenance of other aspects of the vehicle without the need for attendance by a specialist electrical engineer.

Preferably, the chassis incorporates first and second fixed mounting points and a third pivoting mounting point to which the battery is mounted: this has as an advantage that torsional forces acting on the chassis are not passed on to the battery.

Preferably, the chassis incorporates an intermediate frame section comprising the first and second fixed mounting points.

More preferably, the intermediate frame section comprises left and right frame parts, each connected at its ends by a front frame part and a rear frame part, each of the left and right frame parts being provided with a rear mounting support adjacent the rear frame part to provide the first and second fixed mounting points, and a bottom frame part located near and extending between a lower region of each of the left and right, front and rear frame parts. Preferably, the front frame part is provided with mounting means for pivotally mounting a front support, the mounting means providing the third pivoting mounting point, the front support extending transversely across the chassis.

According to a further aspect of the invention an agricultural vehicle comprises a chassis, a rechargeable high voltage DC electric battery, an encapsulated power electronics unit and high voltage connectors connected to the high voltage DC electric battery by way of the power electronics unit, in which the chassis incorporates an intermediate frame section in which the encapsulated power electronics unit is located, the intermediate frame section providing access for releasably securing the high voltage connectors to a lower region of the power electronics unit.

Preferably the access is provided by a plurality of openings in a lower part of the intermediate frame section. More preferably, at least one of the plurality of openings is transversely spaced from another or the others of the plurality of openings.

BRIEF DESCRIPTION OF THE DRAWINGS

The invention will now be described, by way of example only, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
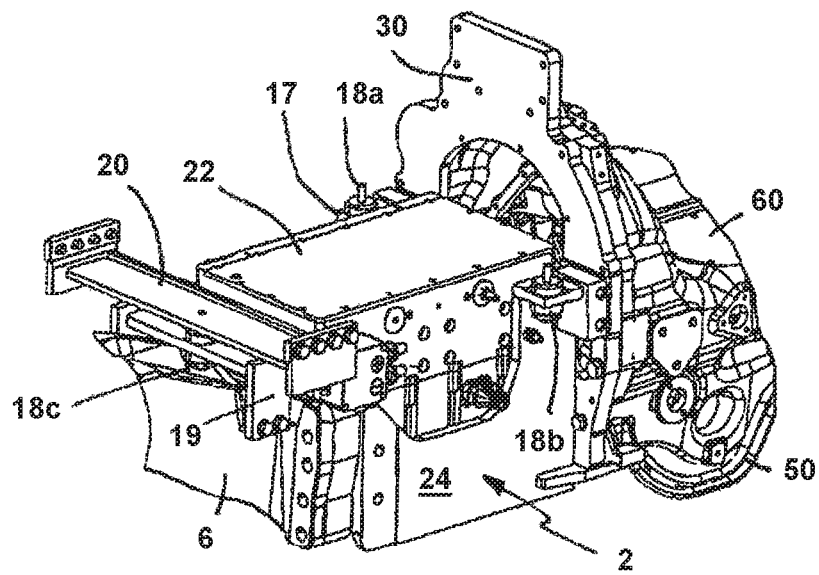
FIG. 1 shows a detail of a chassis including a battery pack support for use in the present invention.
Figure 6:
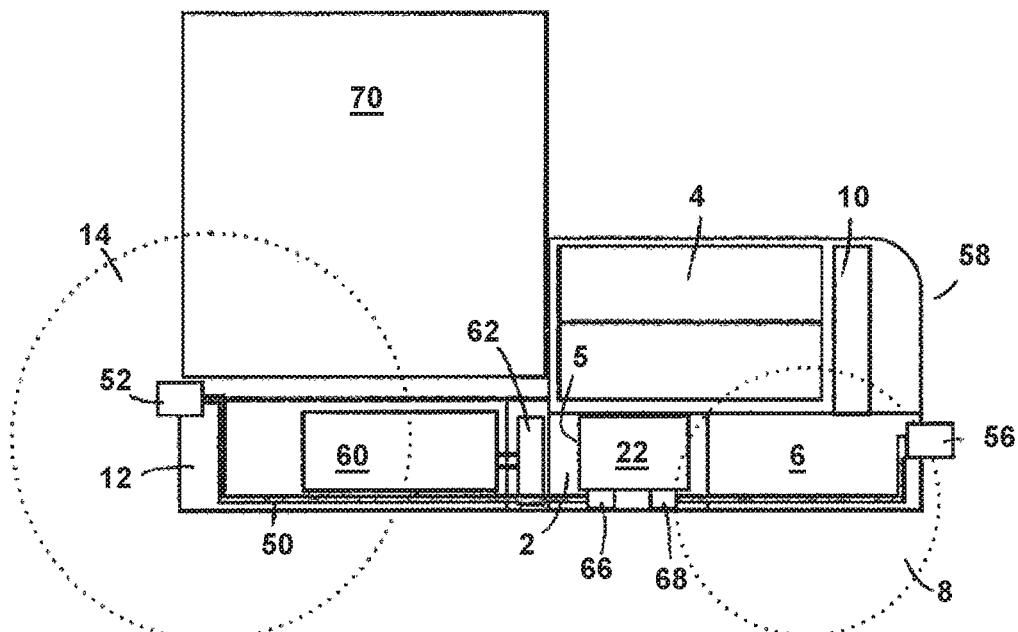
FIG. 6 shows in schematic form a first embodiment of a vehicle in accordance with the present invention and the high voltage connectors connected.
Figure 7:
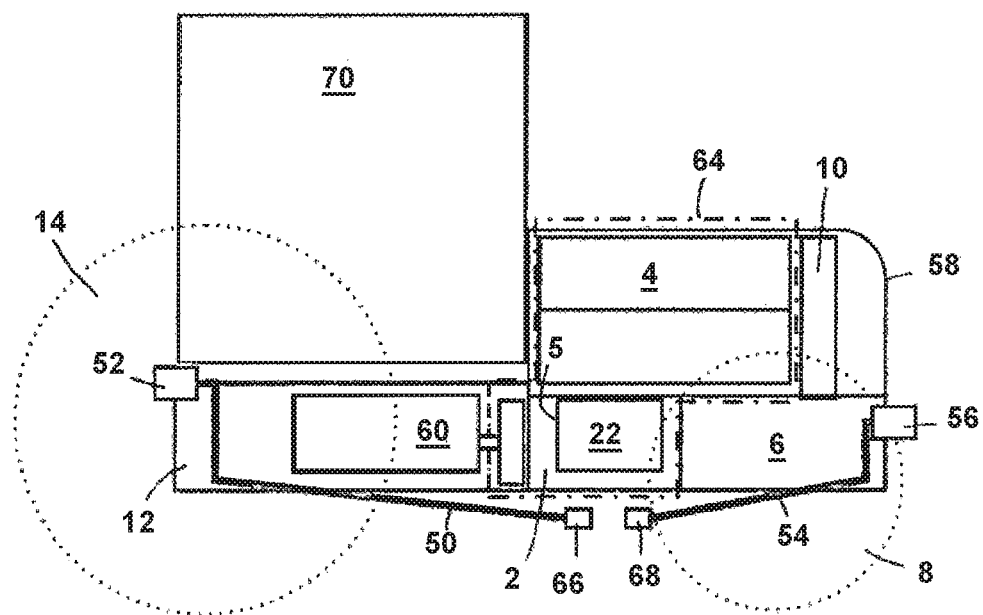
FIG. 7 shows in schematic form the embodiment of a FIG. 6 with the high voltage connectors disconnected.

With reference to FIG. 1, there is shown a detail of a chassis comprising a number of elements including an intermediate frame section or mid chassis unit 2, part of a front frame section 6 and part of a transmission housing 60 (see also FIGS. 6 & 7).

The transmission housing 60 forms part of a rear frame section 12 that may incorporate or be connected to a rear axle housing (not shown) for a rear wheel differential and a rear axle for rear wheels 14.

The front frame section 6 is shown connected to a first front end of the intermediate frame section 2. The front frame section 6 conveniently incorporates a front axle carrying front wheels 8. The front frame section 6 may also be used to mount a heat exchanger unit 10 including heat exchanger and a fan (not shown) for a vehicle cooling system. Any suitable means may be utilised to make this connection.

At the rear of the intermediate frame section 2, at an upper edge are located two rear mounting points or supports 16, 17 for a housing of an electric battery pack 4. The electric battery pack is resiliently mounted to mounting points or supports 16, 17 of the intermediate frame section 2, for example by way of rubber dampers 18a, 18b.

At the rear end of the front frame section 6, a support structure 19 is provided for resiliently mounting a front support beam 20 extending transversely across the chassis for the electric battery pack housing. A central rubber damper 18c may be provided for this purpose. The provision of the central rubber damper 18c enables the front support beam 20 to pivot about a longitudinal axis and together with the dampers 18a, 18b of the two rear mounting points or supports 16, 17 provides a three point mounting for the electric battery pack housing.

It is particularly advantageous to provide such a three point mounting for the electric battery pack housing in that rechargeable electric batteries may fail if subject to torsional stresses. In the case of automotive road vehicles, this is not usually an issue given the relatively even road surfaces over which automotive road vehicles are typically driven. However, it will readily be understood that this is not the case for an agricultural vehicle required over a substantial part of its working life to be driven over uneven surfaces. Such a mounting also eliminates the need to provide a stronger and potentially much heavier housing for the battery pack in order to resist such forces. Thus the use of existing battery packs intended for automotive applications may be utilised.

A power electronics unit 22 is located within the intermediate frame section 2. In the illustrated embodiment the power electronics unit 22 is located directly below the electric battery pack. The power electronics unit 22 is an encapsulated unit and may include, by way of example, interfaces with the high voltage networks, such as a suitable inverter, a brake chopper and a high voltage connector control. Other suitable power electronics components may also be encapsulated within the power electronics unit as required.

Further components, e.g., a power distribution unit and components of a transformer oil supply system (reservoir, coolers, pumps) 5, are mounted to the intermediate frame section 2. The transformer oil supply system provides a cooling medium which has excellent electrical insulating properties so that batteries and electric motors can be cooled accordingly.

Figure 2:
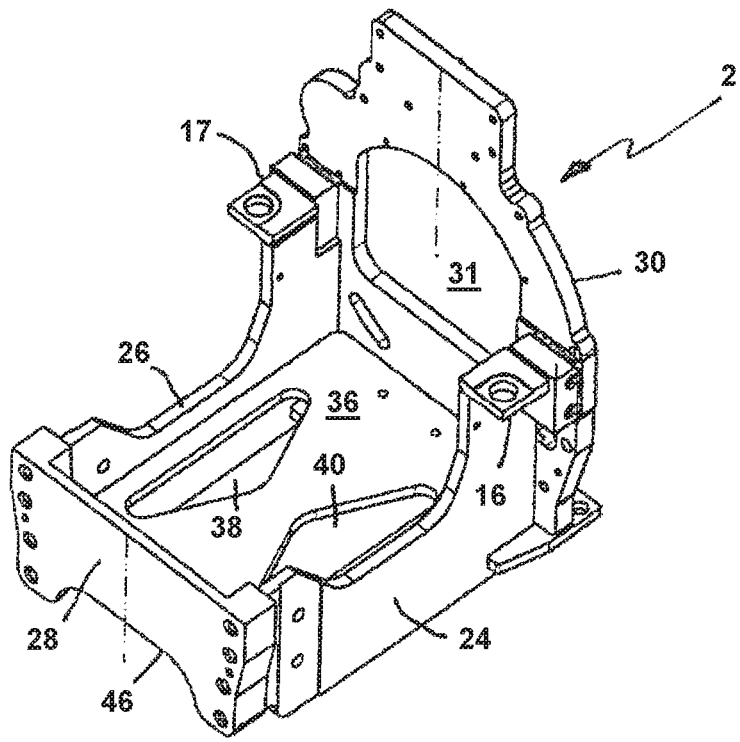
FIG. 2 shows a perspective view of an intermediate frame section for use in the present invention.

The intermediate frame section 2 is shown in more detail in FIG. 2 with the power electronics unit and the front and rear supports omitted for clarity. The intermediate frame section 2 comprises left and right frame parts 24, 26, each connected at their ends by a front frame part 28 and a rear frame part 30, each of the left and right frame parts being provided with one of the rear support mountings 17, 18 adjacent the rear frame part 30, and a bottom frame part 36 located near and extending between a lower region of each of the left and right, front and rear frame parts 24, 26, 28, 30. The frame parts 24, 26, 28, 30, 36 may be secured together by any suitable means for example by welding or fasteners such as bolts. Alternatively, the intermediate frame section 2 may be provided as a unitary body for example by casting or moulding.

In an alternative embodiment, not shown, the support structure for mounting the front support beam 20 may be mounted to the front frame part 28 by any suitable means, for example by way of an intermediate panel secured to the front frame part 28 or an upward extension of the front frame part 28 extending upwards beyond the front edges of the right and left side frame parts 24, 26. The front support beam 20 is again mounted to pivot about a longitudinal axis to provide, together with the two rear mounting points or supports, the three point mounting for the electric battery pack housing.

Returning to the illustrated embodiment, the bottom frame part 36 is provided with a plurality of openings. In the illustrated embodiment two generally triangular openings 38, 40 are provided. Each of the openings 38, 40 can be seen to be transversely spaced from the other.

The rear frame part 30 is also provided with a window or opening 31 through which cables and or cooling lines (not shown) of the cooling system may be provided.

Figure 3:
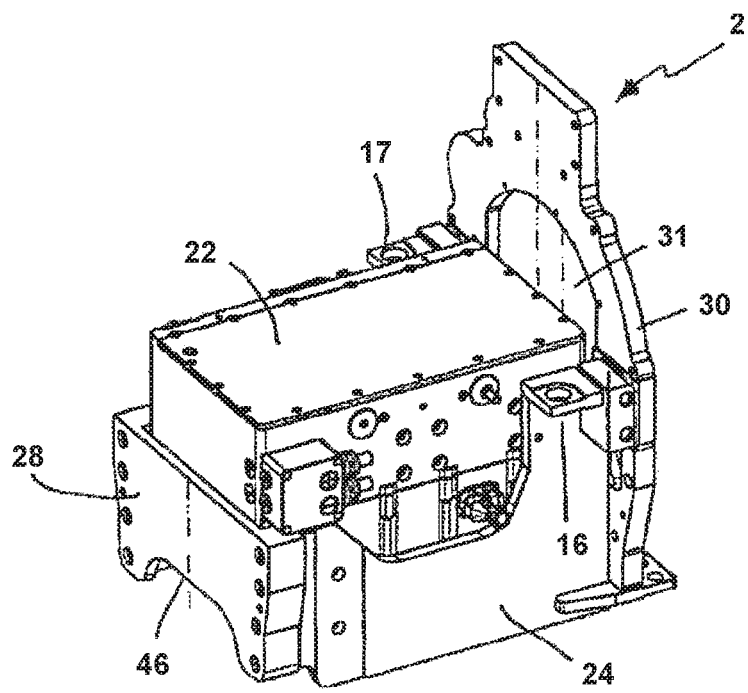
FIG. 3 shows a view of perspective view of the intermediate frame section of FIG. 2 with a power electronics unit in place.
Figure 4:
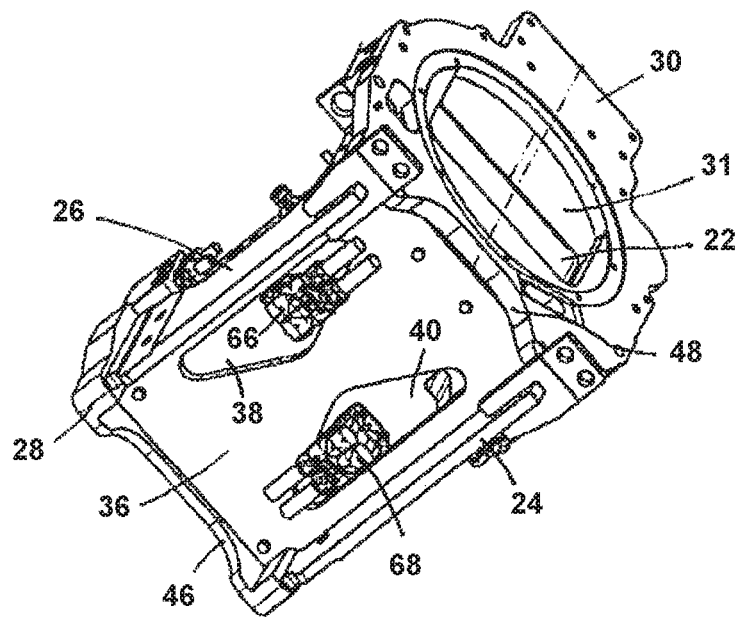
FIG. 4 shows a view from below of the intermediate frame section and power electronics unit shown in FIG. 3.

As may be seen from FIG. 3, the intermediate frame section 2 is configured to receive the power electronics unit 22. The power electronics unit 22 is provided on a bottom surface with high voltage connector sockets (not shown). Each of the connector sockets is accessible through one of the generally triangular openings 38, 40 in the bottom frame part 36 of the intermediate frame section 2. As can be seen the bottom frame part 36 is spaced from a lower edge of the left and right, front and rear frame parts 24, 26, 28, 30. Each of the front and rear frame parts 28, 30 are provided at a lower edge with a recessed or cut away portion 46, 48.

It will be understood that recessed or cut away portions 46, 48 allow for the location of a suitable drive shaft aligned with the longitudinal axis of the vehicle beneath the intermediate frame portion 2 of the chassis, for example a cardan shaft to drive the front wheels. It will further be understood that the transverse spacing of the openings 38, 40 in the bottom of the intermediate frame section 2 allows access to the high voltage connector sockets even when the drive shaft (or other components such as hydraulic pipes/hoses or a PTO shaft) is installed beneath intermediate frame section 2. Alternatively, if such components are located offset from the longitudinal axis of the vehicle, openings 38, 40 may be positioned to one side to enable access to the high voltage connector sockets to be maintained even when such components are installed. For example such openings may be longitudinally spaced from one another.

Figure 5:
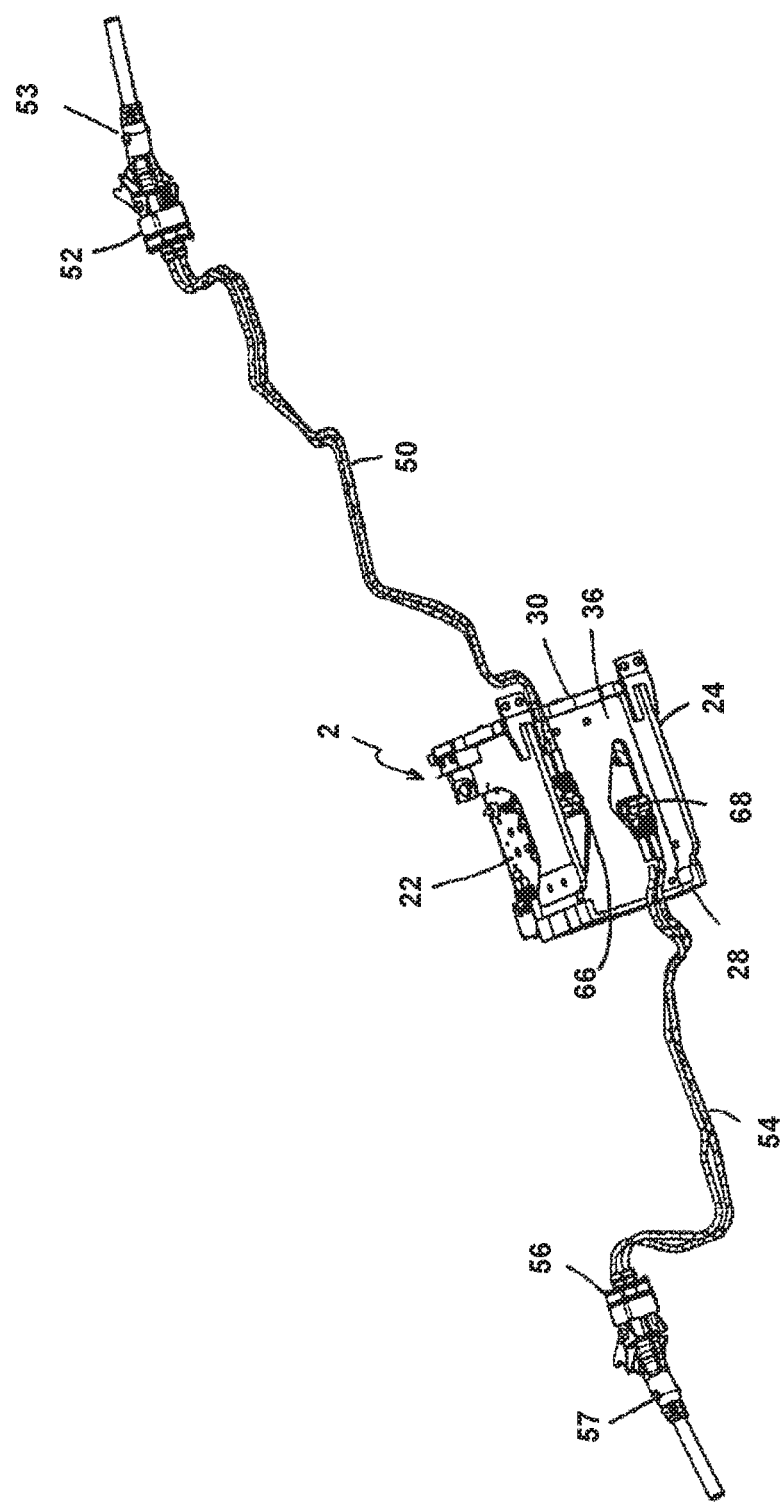
FIG. 5 shows a view similar to that of FIG. 4 with high voltage connectors also shown.

Referring to FIG. 5 a first high voltage supply line 50 is shown releasably connected at a first end by a first end connector 66 to the first high voltage connector socket and extending though the recessed or cut away portion 48 of the rear frame part 28.

A rear implement connector 52 is provided at a second end of the first high voltage supply line 50. The rear implement connector 52 will be understood to be capable of being connected and disconnected to an external connector 53 of a suitable implement or tool by a vehicle operator without the need for a specialist electrical engineer. A second high voltage supply line 54 is shown releasably connected at a first end by a second end connector 68 to the second high voltage connector socket and extending though the recessed or cut away portion 46 of the front frame part 30.

A front implement connector 56 is provided at a second end of the second high voltage supply line 54. The front implement connector 56 will also be understood to be capable of being connected and disconnected to an external connector 57 of a suitable implement or tool by a vehicle operator without the need for a specialist electrical engineer.

The first high voltage supply line 50 can also be seen in FIG. 1.

The high voltage supply lines 50, 54 are connected to the high voltage connector sockets 42, 44 of the power electronics unit 22 by the end connectors 66, 68 so as to permit safe disconnection of the high voltage supply lines 50, 54 from the high voltage DC supply of the battery pack 4 without the use of a suitably qualified electrical engineer. Thereby an engineer not qualified for high voltage work can easily disconnect the high voltage DC supply for most areas of the vehicle to repair or exchange non-high voltage components such as wheels or parts of the engine, hydraulic system or cab.

Additionally since both ends of the high voltage supply cables 50, 54 can be disconnected safely, safe replacement of the high voltage supply cables 50, 54 is enabled.

It can also be seen that the high voltage connectors 42, 44 are located within the volume shielded to the sides by the lower edges of the left and right frame parts 24, 26. It can be seen that the high voltage connectors 42, 44 are in a safe position.

The driveline may include a continuously variable transmission 60 of the hydrostatic-mechanical split type (FIGS. 6 & 7). The battery pack 4 may be used by way of the power electronics unit 22 to power an electric motor 62 for driving the continuous variable transmission of the vehicle.

The cables from the power electronics unit 22 to the electric motor 62 can be guided through the window or opening 31 in the same manner as the pipes and hoses of the cooling system for connection with the electric motor 62.

The rear frame part 30 is ring-shaped around the opening 31 to enable connection with a housing of a continuously variable transmission 60 having a similar ring shaped section at its end adjacent the intermediate frame section 2.

When connected (FIG. 6) the power electronics unit 22 allows the high voltage DC power of the battery pack to be converted to provide a high voltage DC or AC source for powering implements when connected to one or both of the front and rear of the vehicle.

When the high voltage supply lines 50, 54 are disconnected (FIG. 7) only a limited region of the vehicle electronics remain connected to the high voltage area of the vehicle (within the dotted lines 64 of FIG. 7). Maintenance and repair of the rest of the vehicle, for example to a linkage, to the wheels or to the cab, that is outside of the dotted lines 64, may now be performed without requiring a specialist electronics engineer to attend.

A further advantage of locating the power electronics unit 22 within the intermediate frame section 2 is that it allows a common platform to be utilised for a number of agricultural vehicles. The intermediate frame section 2 may be exchangeable between platforms. Additionally the front section may also be common between vehicles. In addition to the tractor shown in FIGS. 6 and 7, a sprayer is shown by way of example in FIG. 8. Similar reference numerals will be used for like parts, with the reference numerals being incremented by 100.

Figure 8:
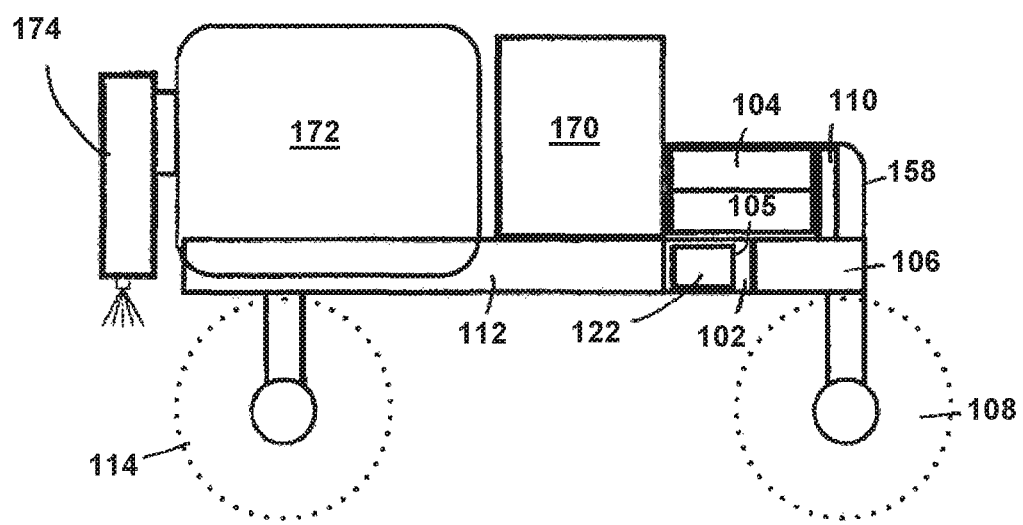
FIG. 8 shows in schematic form a second embodiment of a vehicle in accordance with the present invention.

The intermediate frame sections 102 are common to the sprayer of FIG. 8 and the tractor of FIGS. 6 and 7. The front frame section 106 of the sprayer is modified to accommodate a different front wheel structure 108. The sprayer utilises a longer rear frame section 112 provided for the cab 170, the spray agent tank 172 and the spraying mechanism 174. The rear frame section 112 is also adapted to accommodate the different rear wheel structure 114.

Figure 9:
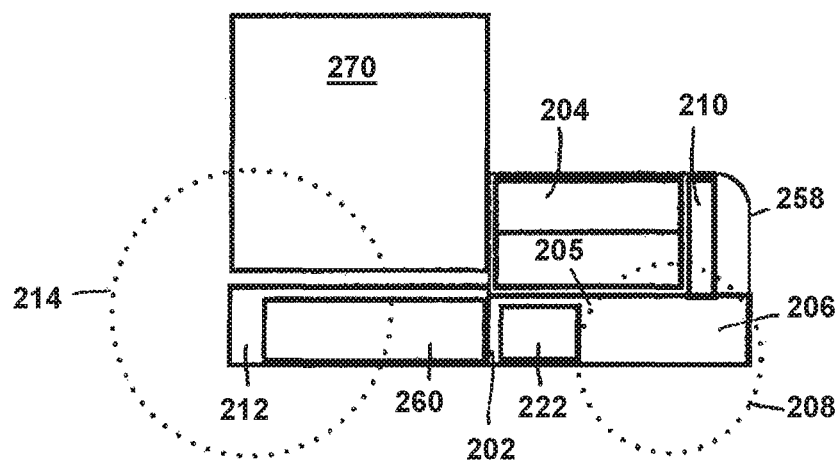
FIG. 9 shows in schematic form a third embodiment of a vehicle in accordance with the present invention.
Figure 10:
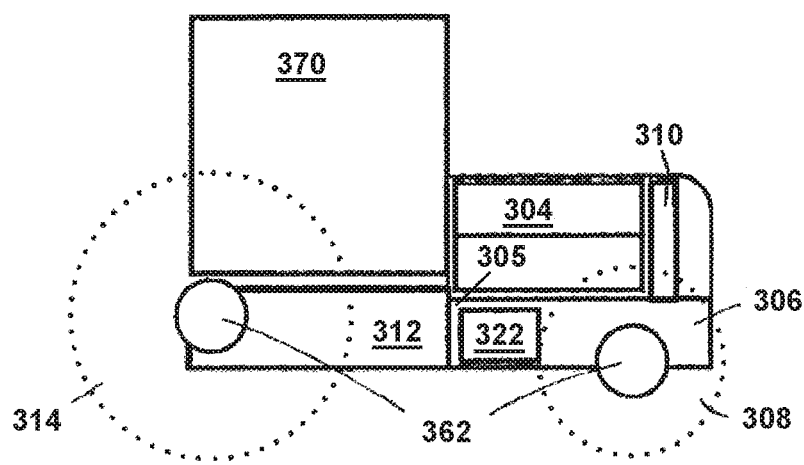
FIG. 10 shows in schematic form a fourth embodiment of a vehicle in accordance with the present invention.
Figure 11:
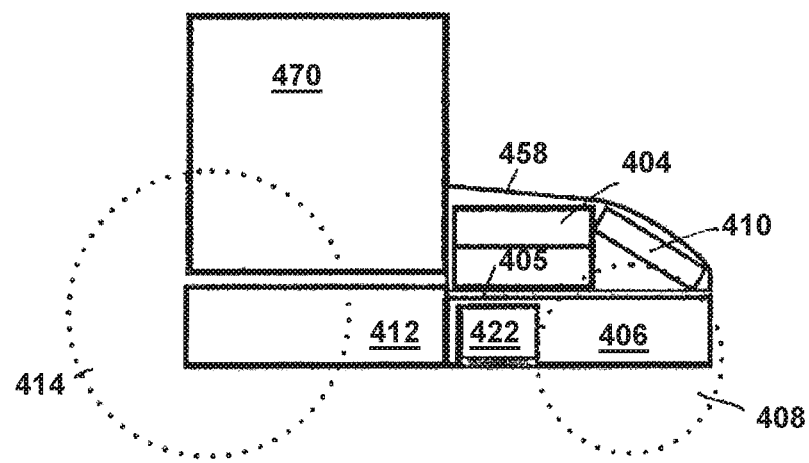
FIG. 11 shows in schematic form a fifth embodiment of a vehicle in accordance with the present invention.

In FIGS. 9, 10 and 11, similar reference numerals will be used for like parts, with the reference numerals being incremented by 200, 300 and 400 respectively.

A still further advantage of the present invention is that it allows for adaption or upgrading of existing vehicles. FIGS. 6 and 7 show a tractor having a conventional transmission 60. As the electric motor 62 for the transmission 60 is located with the transmission, the vehicle may be further adapted. For example a purely electric transmission 260 may be substituted (FIG. 9). Alternatively a separate electric drive 362 for each of the wheel axles may be utilised (FIG. 10). It will be understood that the power electronics unit 222, 322, 422 of each of these embodiments remains located in the intermediate frame section.

Further as the size of battery packs becomes smaller over time a lower profile of the bonnet 458 may be adopted (FIG. 11).

Figure 12:
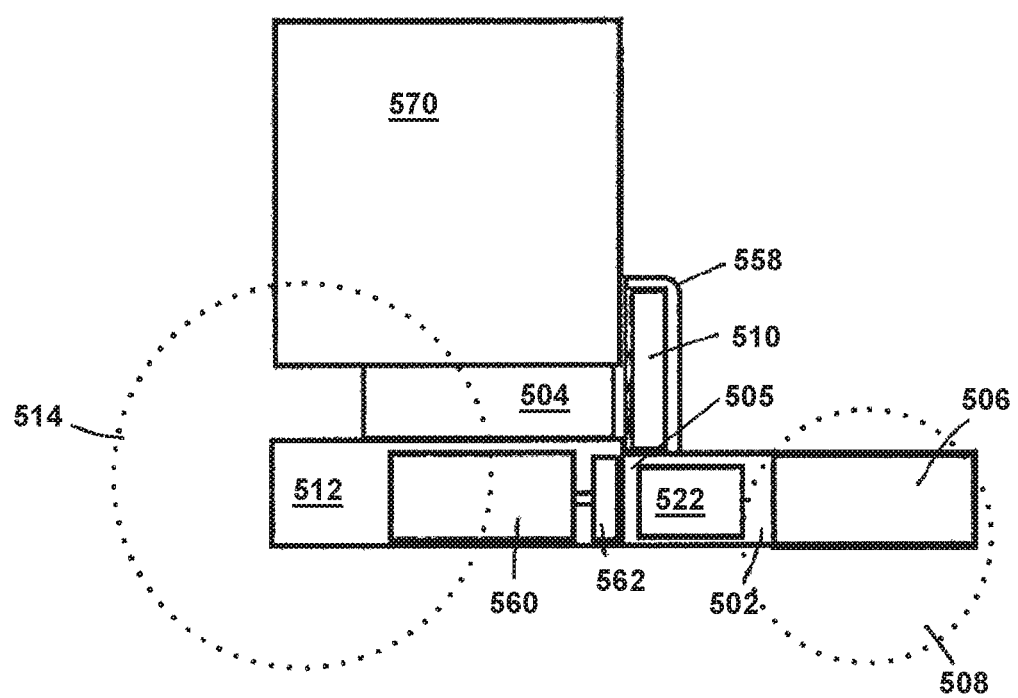
FIG. 12 shows in schematic form a sixth embodiment of a vehicle in accordance with the present invention.

FIG. 12 shows a further adaption of the tractor of FIG. 6. Similar reference numerals will be used for like parts, with the reference numerals being incremented by 500.

Unlike the tractor shown in FIG. 6, an intermediate frame section 502 and a front frame section 506 do not carry a battery pack 504. Instead, the battery pack 504 is installed beneath a cab 570. The intermediate frame section 502 still carries the power electronics unit 522. A heat exchanger unit 510 is located above the intermediate frame section 502. The heat exchanger unit 510 may be covered by a compact bonnet 558. This enables provision of additional space for installation of tools in the front area of the vehicle. This space is mainly above or below intermediate frame section 502 and front frame section 506 and allows for improved visibility by the driver of the vehicle.

Similarly, in a sprayer, the battery pack may also be installed apart from an intermediate frame section and a front frame section (e.g. underneath a cab or spray agent tank) to enable the cab to be moved forward while still using the intermediate frame section with the integrated power electronics unit.

In the above descried embodiments, the intermediate frame section and the front frame section are separate parts. However, it is envisaged that both sections may be merged in a single part without departing from the scope of the invention.

From reading the present disclosure, other modifications will be apparent to persons skilled in the art. Such modifications may involve other features which are already known in the field and which may be used instead of or in addition to features already described herein.

The invention claimed is:

1. An agricultural vehicle comprising:
   a chassis comprising two transversely fixed rear mounting supports and a third mounting point for pivotally mounting a front support, the front support extending transversely across the chassis; and
   a rechargeable high voltage DC electric battery, wherein the chassis has an intermediate frame section with an encapsulated power electronics unit located within the intermediate frame section connected to the battery.

2. The agricultural vehicle of claim 1, wherein the power electronics unit is integrated in the intermediate frame section of the chassis.

3. The agricultural vehicle of claim 1, wherein the power electronics unit is integrated in the intermediate frame section below the battery.

4. The agricultural vehicle of claim 1, further comprising an electrically powered driveline connected to the intermediate frame section.

5. The agricultural vehicle of claim 1, wherein the intermediate frame section comprises left and right frame parts, each of the left and right frame parts connected at one end to a front frame part and at an opposite end to a rear frame part, each of the left and right frame parts being provided with one of the two rear mounting supports adjacent the rear frame part, and a bottom frame part extending between a lower region of each of the left and right frame parts, and the front and rear frame parts.

6. The agricultural vehicle of claim 5, wherein the front frame part is provided with the third mounting point for pivotally mounting the front support.

7. The agricultural vehicle of claim 1, wherein the battery is mounted to the chassis at each of the two rear mounting supports and the third mounting point.

8. The agricultural vehicle of claim 5, wherein the bottom frame part is provided with a plurality of openings.

9. The agricultural vehicle of claim 8, wherein at least one of the plurality of openings is transversely spaced from each other opening of the plurality of openings to allow access to the at least one of the plurality of openings.

10. The agricultural vehicle of claim 1, further comprising at least one implement connector connected to the high voltage DC electric battery.

11. The agricultural vehicle of claim 8, further comprising at least one implement connector connected to the high voltage DC electric battery wherein the at least one implement connector connects to the power electronics unit through at least one of the plurality of openings in the bottom frame part of the intermediate frame section of the chassis.

12. The agricultural vehicle of claim 10, wherein the power electronics unit comprises at least one releasable connector to connect the at least one implement connector to the power electronics unit.

13. The agricultural vehicle of claim 10, wherein the power electronics unit comprises a releasable connector to connect at least one releasable implement connector to the power electronics unit.

14. An agricultural vehicle, comprising:
   a chassis;
   a rechargeable high voltage DC electric battery, wherein the chassis has an intermediate frame section with an encapsulated power electronics unit located within the intermediate frame section connected to the battery; and
   a power distribution unit and components of a transformer oil supply system connected to the battery.

15. The agricultural vehicle of claim 14, wherein the power distribution unit and the components of the transformer oil supply system are mounted to the intermediate frame section.

16. An agricultural vehicle comprising:
   a chassis;
   a rechargeable high voltage DC electric battery;
   an encapsulated power electronics unit; and
   at least one high voltage connector connected to the high voltage DC electric battery by way of the power electronics unit, wherein the chassis incorporates an intermediate frame section in which the encapsulated power electronics unit is located, the intermediate frame section providing access for releasably securing the at least one high voltage connector to a lower region of the power electronics unit.

17. The agricultural vehicle of claim 16, wherein the access is provided by a plurality of openings in a lower part of the intermediate frame section.

18. The agricultural vehicle of claim 17, wherein at least one of the plurality of openings is transversely spaced from each other opening of the plurality of openings.

* * * * *